United States Patent [19]

Sakakibara et al.

[11] Patent Number: 4,756,287

[45] Date of Patent: Jul. 12, 1988

[54] CONTROL DEVICE FOR A DRIVEN MEMBER

[75] Inventors: Naoji Sakakibara, Chiryu; Tadashi Terazawa, Toyota, both of Japan

[73] Assignee: Aisin Seiki Kabushiki Kaisha, Kariya, Japan

[21] Appl. No.: 46,452

[22] Filed: May 6, 1987

[30] Foreign Application Priority Data

May 13, 1986 [JP] Japan ................. 61-107640

[51] Int. Cl.⁴ ............................................. F02D 9/08
[52] U.S. Cl. .................................. 123/342; 123/361; 123/376
[58] Field of Search .................... 123/342, 376, 361

[56] References Cited

U.S. PATENT DOCUMENTS

| Re. 32413 | 5/1987 | Hayashida | 123/342 |
|---|---|---|---|
| 4,181,103 | 1/1980 | Sturdy | 123/342 |
| 4,212,272 | 7/1980 | Hawk | 123/361 |
| 4,397,276 | 8/1985 | Hayashida | 123/342 |
| 4,548,176 | 10/1985 | Ubida et al. | 123/342 |
| 4,586,471 | 5/1986 | Horada et al. | 123/361 |

Primary Examiner—Raymond A. Nelli
Attorney, Agent, or Firm—Finnegan, Henderson, Farabow, Garrett, and Dunner

[57] ABSTRACT

A control device for a driven member includes a first input member connected to a manual member, an output member connected to a driven member, a middle member connected to the first input member through a first spring and having a first portion to be engageable therewith and a second portion to be engageable with the output member thereby to transmit the movement of the first input member to the output member through the middle member. The device further includes a second input member for moving the output member in operative and inoperative directions of the driven member and an actuator actuating the second input member wherein when the second input member is actuated by the actuator to move the output member in a direction where the driven member returns to the original position, the movement of the first input member will not affect the movement of the output member.

6 Claims, 4 Drawing Sheets

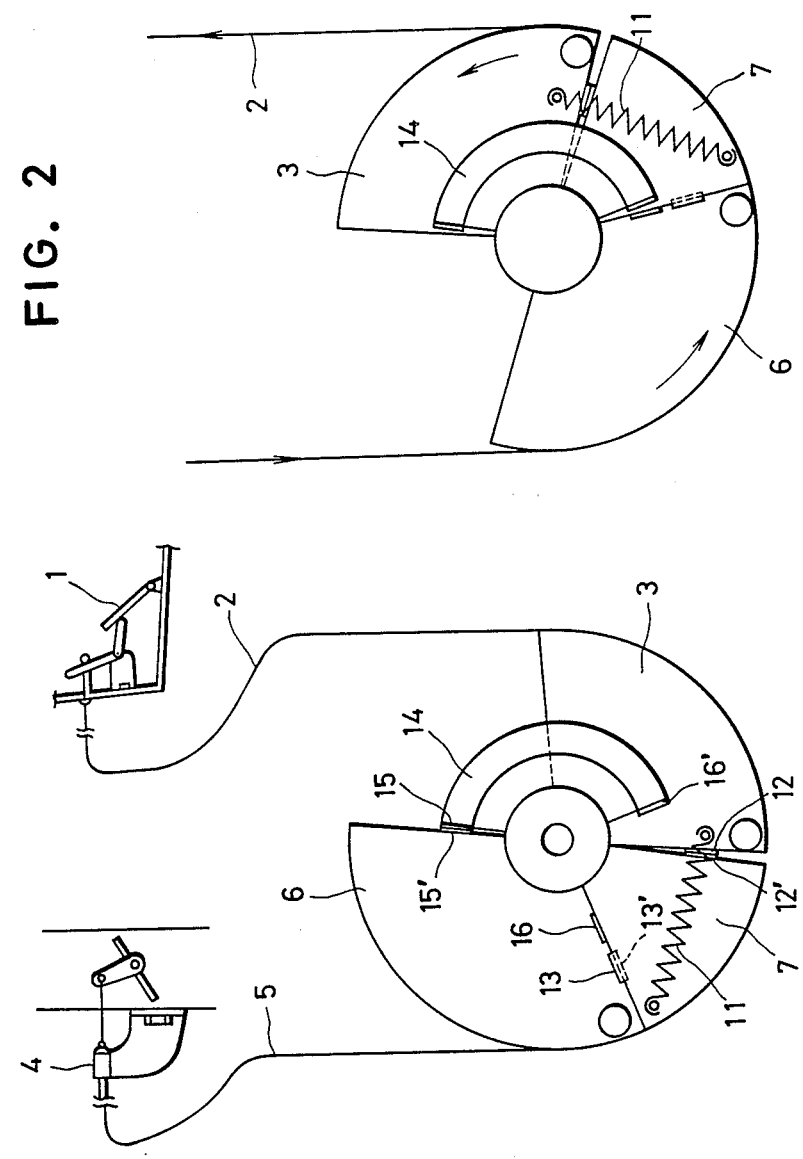

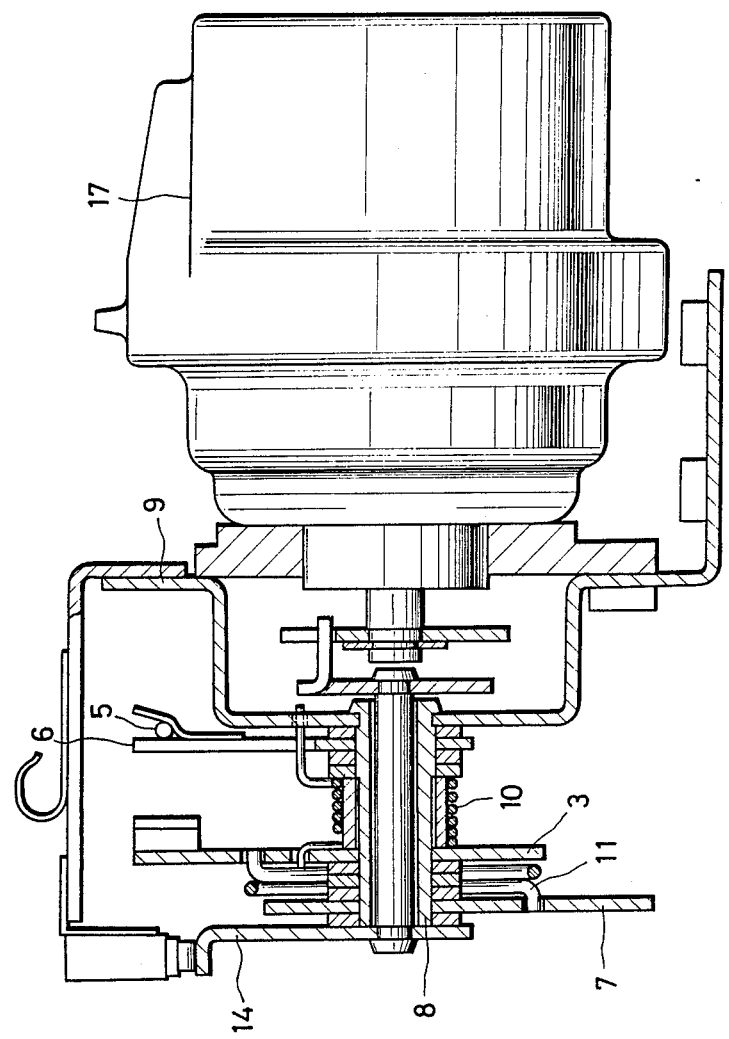

CONTROL DEVICE FOR A DRIVEN MEMBER

BACKGROUND OF THE INVENTION

1. Field of the Invention

This invention relates to a control device for a driven member and more particularly to a control device utilized for controlling a drive member of a controlled device, such as for example, a constant speed control device for vehicles.

2. Statement of Prior Art

As disclosed in a Japanese patent application published as 55-68627 in 1980, a constant speed control device includes a throttle opening degree control mechanism which is actuated by an actuator to adjust the opening degree of the throttle valve in accordance with the load conditions of a vehicle. Thus, the vehicle can be operated to run at a set speed without depressing the acceleration pedal.

Further, it is possible to change the opening degree of the throttle even under the constant speed operation if the operator of the vehicle wishes to change the present speed to a higher speed by depressing the acceleration pedal. However, when the vehicle is running on a slippery road under a constant speed running, even if the operator of the vehicle depress the acceleration pedal to increase the opening degree of the throttle, it is wise to reduce or keep low of the engine output to avoid the vehicle skidding conditions.

SUMMARY OF THE INVENTION

The present invention overcomes the above prior art problems and disadvantages by providing an improved control device for a driven member of a controlled device such as a constant speed control device for a vehicles. Another object of this invention to provide an improved constant speed control device for vehicles.

To achieve the objects above, the device includes a middle member between a first input member of a manual means and an output member of a driven means and a second input member for actuating the output member wherein when the second input member actuates the output member to return the driven means, the movement of the first input member is not transmitted to the output member. The acompanying drawings illustrate the embodiment of the invention and together with the description serve to explain the principles of the invention.

BRIEF DESCRIPTION OF THE DRAWINGS

FIG. 1 shows an embodiment of the invention applied to a vehicle constant speed control device;

FIG. 2 is similar to FIG. 1 but showing a different stage of the operation of the invention;

DESCRIPTION OF THE PREFERRED EMBODIMENT OF THE INVENTION

Figure 4:
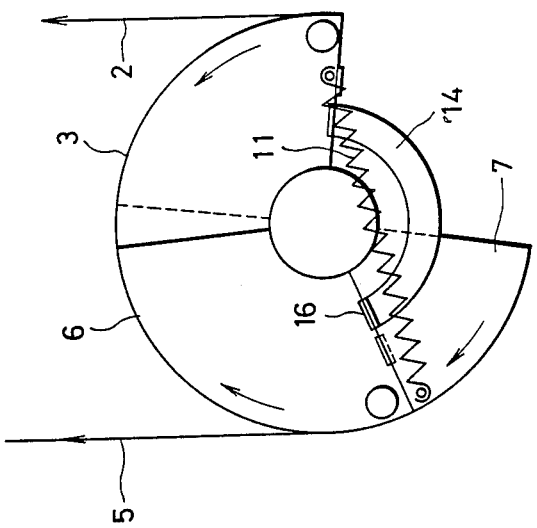
FIG. 4 is similar to FIG. 3, but showing further operational stage of the invention.

Reference is made in detail to the present embodiment of the invention, an example of which is illustrated in the accompanying drawings. A first input member 3 is connected to an acceleration pedal 1 through cable 2. A throttle mechanism 4 is connected to an output member 6 through cable 5. Acceleration pedal corresponds to the manual member, while the throttle mechanism corresponds to the driven member. Between the first input member 3 and the output member 6 is a middle member 7 for transmitting the movement therebetween. The first input member 3, the middle member 7 and the output member 6 are supported on a sleeve member 8 as shown in FIG. 6 to keep the coaxial relation therewith.

Figure 5:
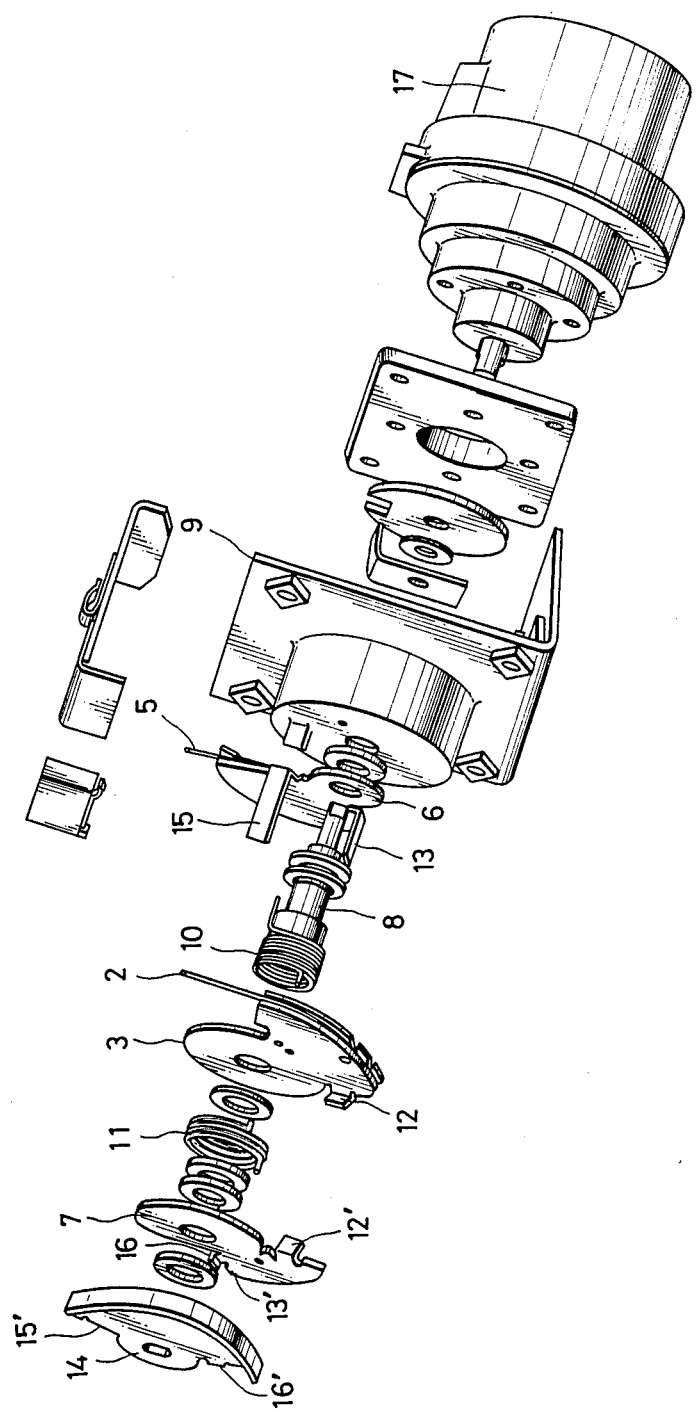
FIG. 5 shows an exploded view of the invention applied to the vehicle constant speed control device; and, FIG. 6 is a cross sectional view of the embodiment of the invention.

As shown in FIG. 5 and FIG. 6, a first spring 10 is provided and is engaged with a bracket 9 at one end and engaged with the first input member 3 at the other end to always bias the first input member 3 to its initial position. Accordingly, when the operator of the vehicle releases the acceleration pedal, the first input member 3 is returned to its original position by the force of spring 10. The output member 6 is biased toward the direction of closing the throttle valve by a spring (not shown) and the middle member 7 is connected to the first input member 3 by a second spring 11 and is biased toward the first input member 3.

The first input member 3 includes a hook 12 which is engageable with a hook 12' provided on the middle member 7 and the middle member 7 further includes another hook portion 13' to be engageable with a hook portion 13 provided on the output member 6. Accordingly, when the acceleration pedal 1 is depressed, the first input member 3 is rotated in counterclockwise direction as viewd in FIG. 2 and at the same time the middle member 7 is rotated in the same direction (counterclockwise) by the force of second spring 11. The rotation of the middle member 7 in the counterclockwise direction will engage the hook portions 13 and 13' to thereby rotate the output member 6 in the same direction to open the throttle mechanism 4. Thus, a desired opening degree of the throttle can be obtained in accordance with the depression of the acceleration pedal 1.

A second input member 14 is provided coaxially with the first input member 3. The second input member 14 includes an engaging portion 15' which is engageable with a portion 15 provided on the output member 6. The second input member 14 further includes another engaging portion 16' which is engageable with a portion 16 provided on the middle member 7.

The actuator (motor) 17 is provided to actuate the rotation of the second input member 14. Both member 14 and the motor 17 constitute a part of the vehicle constant speed control device.

When the actuator 17 receives a signal indicating a set speed (for example, 50 km/h), the second input member 14 is rotated in the counterclockwise direction by the degree determined by the signal. Then the engaging portion 15 will contact the portion 15' of the output member 6 to in turn rotate the output member 6 in the same direction to open the throttle degree to the set amount. Under these conditions, even the pedal 1 is depressed, the vehicle keeps the set running speed (for example, 50 m/h). However, if the pedal depression exceeds the set speed, then the hook portion 13' of the middle member 7 engages with the corresponding hook portion 13 of the output member 6 to further rotate the output member 6 in the counterclockwise direction to increase the vehicle speed. When the pedal 1 is released, then the output member 6 is returned to engage the hook portion 15 with the corresponding hook portion 15' of the middle member 14 to resume the set speed.

Figure 3:
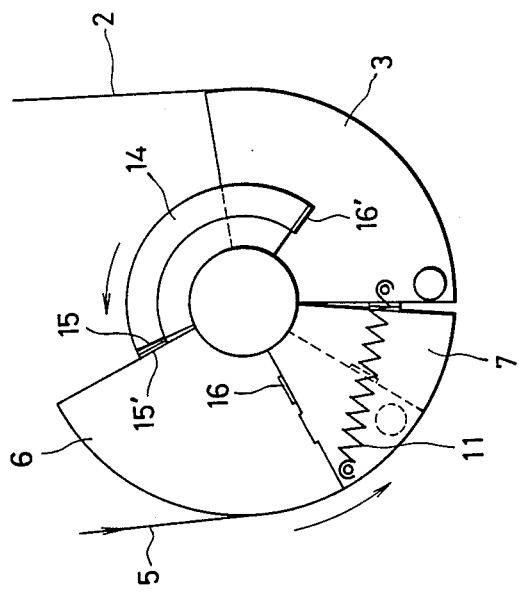
FIG. 3 is similar to FIG. 2 but showing another stage of operation of the invention.

When the vehicle is running on a slippery road, the actuator 17 receives a signal indicating the wheel slipping condition from a sensor, not shown, to rotate the second output member 14 in the clockwise direction a viewed in FIGS. 2 and 3. This clockwise rotation of the member 14 will cause the engagement between hook portion 16' of the second output member 14 and a hook portion 16 of the middle member 7. Thus the output member 3 to thereby rotate the output member 6 in the clockwise direction to reduce the opening degree of the throttle as shown in FIG. 4. Under these conditions, when the pedal 1 is depressed to further open the throttle opening degree, the movement of the pedal depression will not be transmitted to the middle member 7 since the force of the actuator 17 is greater then the force of spring 11 which biases the middle member 7 in the direction of opening the throttle. As explained, when the vehicle is in a skidding condition, the engine output will not be increased by the acceleration pedal depression in order to prevent the vehicle skidding. The actuator 17 may be used a vacuum type instead of the electrical motor and is actuated in response to vehicle speed, set speed, brake force, clutch conditions, etc. by using microprocessor, not shown. It will be apparant to those skilled in the art that various modifications can be made within the scope of the appended claims and their equivalents.

What is claimed is:

1. A control device for a driven member comprising:
    a first input member connected to a manual means;
    an output member connected to a driven means;
    a middle member connected to said first input member through a first spring means and having a first portion to be engageable therewith and a second portion to be engageable with said output member thereby to transmit the movement of said first input member to said output member through said middle member;
    a second input member for moving said output member in operative and inoperative directions of said driven means; and
    an actuator actuating said second input member wherein when said second input member is actuated by said actuator to move said output member in a direction where said driven member returns to the original position, the movement of said first input member will not affect the movement of said output member.

2. Device according to claim 1 wherein said first input member, said output member and said middle member are coaxially arranged and said manual means is an acceleration pedal and said driven means is a throttle opening mechanism to control the opening degree of a throttle valve of an engine.

3. Device according to claim 2, wherein said actuator and said second input member constitute a part of a vehicle constant speed control device.

4. Device according to claim 3, wherein said second input member is operatively connected to said actuator and further is engageable with said output member.

5. Device according to claim 4, wherein said second input member is engageable with said middle member at a third portion thereof.

6. Device according to claim 4 wherein said second input member is engageable with said output member.

* * * * *